United States Patent
Mujica et al.

(10) Patent No.: US 7,236,532 B2
(45) Date of Patent: Jun. 26, 2007

(54) METHOD OF INITIALIZING A COMMUNICATION SYSTEM WITH DIFFERENT BANDWIDTH RECEIVERS AND TRANSMITTERS

(75) Inventors: Fernando A. Mujica, Allen, TX (US); Michael O. Polley, Garland, TX (US); Arthur J. Redfern, Plano, TX (US); Nirmal C. Warke, Dallas, TX (US); Yaser M. Ibrahim, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 826 days.

(21) Appl. No.: 09/878,547

(22) Filed: Jun. 11, 2001

(65) Prior Publication Data

US 2003/0039314 A1  Feb. 27, 2003

(51) Int. Cl.
  *H04K 1/10* (2006.01)
  *H04L 27/28* (2006.01)
(52) U.S. Cl. ............. 375/260; 375/222; 375/259; 341/123; 455/59
(58) Field of Classification Search ......... 375/260, 375/346, 222, 259; 341/123; 455/59
  See application file for complete search history.

(56) References Cited

U.S. PATENT DOCUMENTS

| | | | | |
|---|---|---|---|---|
| 5,815,101 A * | 9/1998 | Fonte | ............. | 341/123 |
| 6,044,107 A * | 3/2000 | Gatherer et al. | ......... | 375/222 |
| 6,519,291 B1 * | 2/2003 | Dagdeviren et al. | ......... | 375/260 |
| 6,650,658 B1 * | 11/2003 | Mueller et al. | ......... | 370/480 |
| 6,650,697 B1 * | 11/2003 | Tate et al. | ......... | 375/222 |
| 6,693,957 B1 * | 2/2004 | Wingrove et al. | ......... | 375/222 |

FOREIGN PATENT DOCUMENTS

WO   WO 99/52239   10/1999

OTHER PUBLICATIONS

Jackson, Al, "ADSL For High-Speed Broadband Data Service," 1998 IEEE 0-7803-4311, pp. 451-465.
Mujica, Fernando A., et al., "SNR Estimation for a Reduced-rate Receiver Communicating with a Full-rate Transmitter in the Context of DMT Modulation," Communications Systems Laboratory, DSP Research & Development Center, Texas Instruments Incorporated, Nov. 1, 2000, pp. 1-6.

* cited by examiner

*Primary Examiner*—David C. Payne
*Assistant Examiner*—Erin M. File
(74) *Attorney, Agent, or Firm*—Steven A. Shaw; W. James Brady; Frederick J. Telecky, Jr.

(57) ABSTRACT

A method of communicating across a channel includes receiving information having a known bandwidth and a known spectrum. The information is preferably in the form of a multicarrier modulated signal, e.g., a DMT signal. In one aspect, this information is received at a receiver having a reduced channel bandwidth. An aliasing spectrum can be calculated based on the known spectrum and the frequency difference between the known bandwidth and the reduced-channel bandwidth. The received information can then be modified based upon the aliasing function to compensate for alias distortion. For example, the received information can be modified by modifying the noise component or signal-to-noise ratio of the received information.

15 Claims, 3 Drawing Sheets

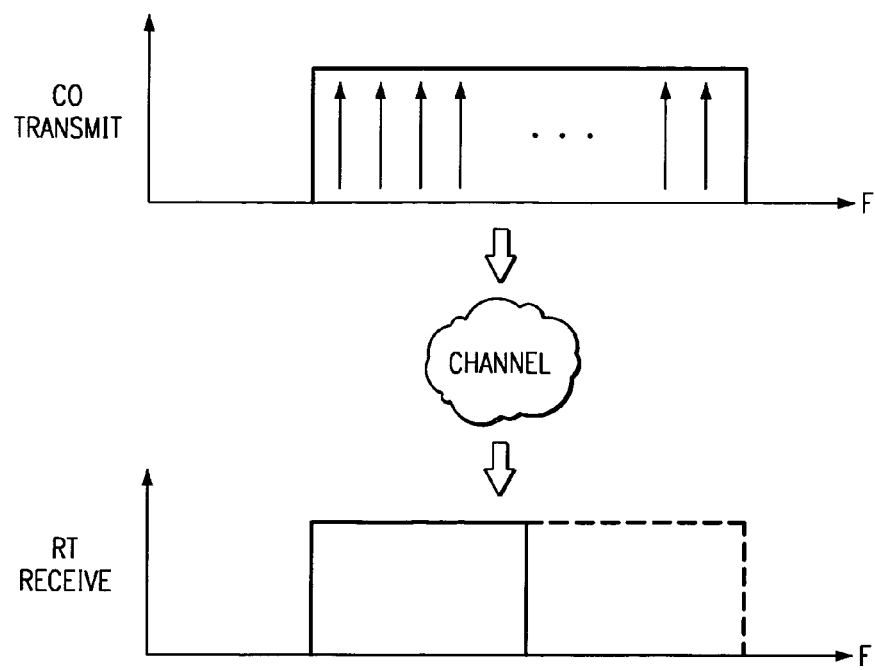
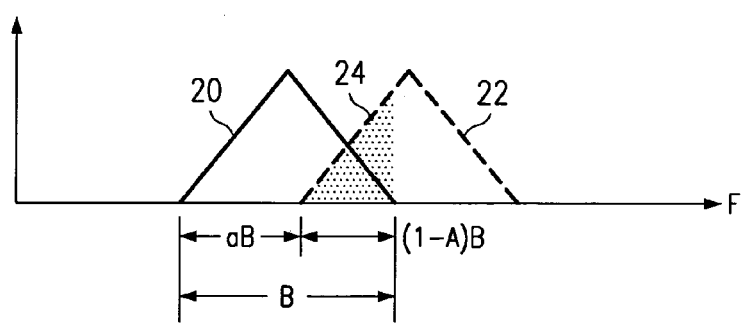
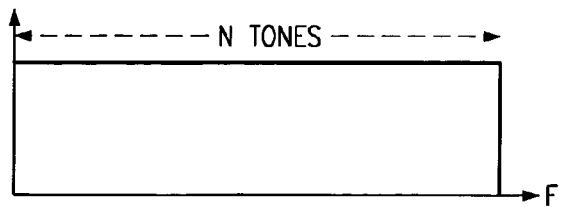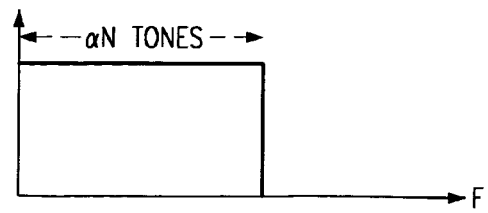

METHOD OF INITIALIZING A COMMUNICATION SYSTEM WITH DIFFERENT BANDWIDTH RECEIVERS AND TRANSMITTERS

FIELD OF THE INVENTION

This invention relates generally to communication systems and specifically to a method of initializing a communication system with different bandwidth receivers and transmitters.

BACKGROUND OF THE INVENTION

Communication systems are used to transfer information from one location to another. The content and format of this information can vary greatly depending upon the type of system and the application. For example, there is a great need to communicate digital information such as data, voice, video and others. Depending upon the channel used, this information is often transmitted in analog form.

FIG. 1 illustrates a simple block diagram of a conventional receiver 10. An analog signal is received at analog receiver 12. The signal is then digitized in analog-to-digital converter (ADC) 14. The digital information can then be processed using a digital processor 16.

As is well known, the Nyquist theory states the minimum sampling rate required to turn an analog signal into an accurate digital representation. Specifically, the sampling rate must be at least twice that of the highest component of the analog frequency in order to accurately reproduce the sampled signal. FIGS. 2a-2c illustrate this point.

FIG. 2a shows the frequency spectrum of an arbitrary analog signal. As shown in FIG. 2b, when the signal is sampled, an image spectrum will be generated. The image spectrum will be a mirror image of the original spectrum with the sample frequency serving as the axis of symmetry. This result leads to the Nyquist theory. If the sample frequency is greater than the maximum frequency of the original spectrum, the original spectrum will be retrievable. If, however, the sample frequency is less than the maximum frequency, the image spectrum will overlap the original spectrum, as shown in FIG. 2c. This effect is known as aliasing. The portion of the image spectrum that overlaps the original spectrum, referred to as the aliasing spectrum or alias band herein, will distort the original spectrum and prevent accurate reproduction.

SUMMARY OF THE INVENTION

In one aspect, the present invention provides a technique for evaluating the effect of the aliasing spectrum and compensating for this effect. This technique can be utilized, for example, during the initialization sequence of a communication system when each device is evaluating the communication link and determining the rate and bandwidth that will be used.

A preferred embodiment of the present invention provides a method of communicating across a channel includes receiving information having a known bandwidth and a known spectrum. The information is preferably in the form of a multicarrier modulated signal, e.g., a Discrete Multitone (DMT) signal. In one aspect, this information is received at a receiver having a reduced channel bandwidth. An aliasing spectrum can be calculated based on the known spectrum and the frequency difference between the known bandwidth and the reduced-channel bandwidth. The received information can then be modified based upon the aliasing function to compensate for alias distortion. For example, the received information can be modified by modifying the noise component or signal-to-noise ratio of the received information.

This method can be used, for example, to initialize the channel. During an initialization sequence, known symbols are transferred from one modem to the other. These known symbols can be used to estimate the effect of the alias channel on the reduced channel. For example, a corrected reduced channel signal-to-noise ratio can be estimated. This corrected value will more accurately predict the operability of the channel. This increase in accuracy leads to an increase in available bandwidth and therefore a more efficient system.

BRIEF DESCRIPTION OF THE DRAWINGS

FIG. 4 illustrates the situation where a transmitter of one bandwidth transmits information to a receiver of a smaller bandwidth;

FIG. 5 illustrates the aliasing effect of a receiver as in FIG. 4;

FIGS. 6a and 6b illustrate the frequency utilization of a reduced rate versus a full rate DMT based modem.

DETAILED DESCRIPTION OF ILLUSTRATIVE EMBODIMENTS

The making and use of the various embodiments are discussed below in detail. However, it should be appreciated that the present invention provides many applicable inventive concepts which can be embodied in a wide variety of specific contexts. The specific embodiments discussed are merely illustrative of specific ways to make and use the invention, and do not limit the scope of the invention.

The present invention can be utilized in a number of contexts. For example, the preferred embodiment communication system is a digital subscriber line (DSL) system. As a result, the present invention will first be described in the context of such a system. It should be recognized, however, that the inventive concepts can apply to a number of other systems as well.

DSL is a technology that dramatically increases the digital capacity of ordinary telephone lines (the local loops) into the home or office. DSL speeds are tied to the distance between the customer and the telephone company central office (CO). DSL is geared to two types of usage. Asymmetric DSL (ADSL) is for Internet access, where fast downstream is required, but slow upstream is acceptable. Symmetric DSL is designed for short haul connections that require high speed in both directions.

Figure 3:
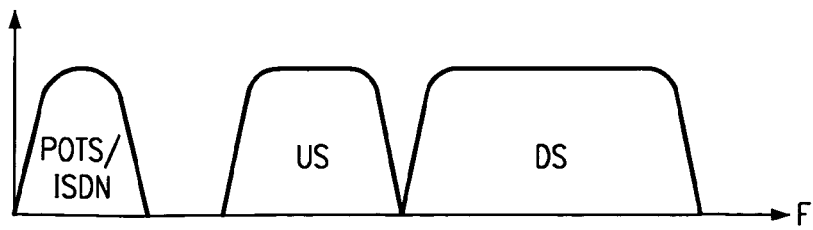
FIG. 3 illustrates the spectrum of an asymmetric DSL channel.

An advantage of a DSL system is that it can operate on an existing telephone system simultaneously with voice traffic. This feature is accomplished by apportioning a different range of frequencies to the data traffic. This spectrum is different than the spectrum already assigned to the voice. An example of an ADSL spectrum is shown in FIG. 3, where the voice occupies the baseband portion of the line and the upstream (US) and downstream (DS) signals utilize a high frequency band. This system is asymmetric because the downstream spectrum (i.e., from CO to remote terminal or RT) has a greater bandwidth than the upstream spectrum (i.e., from RT to CO).

Different standards have evolved that define the bandwidth that will be utilized between the two spectra. For example, the G.dmt standard defines a downstream bandwidth of 1104 kHz while the G.lite standard defines a downstream bandwidth of 552 kHz If two modems are communicating, they will only be able to utilize the bandwidth available to the smaller of the two. For example, when a G.dmt modem communicates with a G.lite modem, the downstream communication will only occur within a 552 kHz band.

Multicarrier communication is a technology in which the available transmission bandwidth is conceptually divided into a number of sub-channels such that the channel response is approximately constant over each of the sub-channels. An orthogonal basis of signals is used to modulate the transmitted data over the different sub-channels. A cyclic prefix can be used to maintain sub-carrier orthogonality and reduce interblock interference.

Multicarrier modulation technology is used to achieve data transmission rates close to the channel capacity. Several applications like audio/video broadcasting, cable television, xDSL modems, mobile local area networks and future generation wideband cellular systems use (or plan to use) multicarrier modulation methods. The present invention is especially used with multicarrier modulation technology.

When the modems use multicarrier modulation scheme, such as digital multitone (DMT), adjusting the bandwidth is a relatively straightforward process. DMT modulation uses a number of carrier signals spaced in frequency. The bandwidth of the entire system can be adjusted by using more or fewer of the sub-carriers. This same principle applies in other multicarrier modulation schemes.

An initialization or training procedure is used to determine the properties of the two devices in the system. These properties include the available bandwidth. FIG. 4 illustrates a situation where a first modem (e.g., CO) sends information to the second (e.g., RT) over a channel. The second modem knows the content of the initialization sequence and determines the information that was successfully transmitted. Based on the results, the two units will determine an appropriate operating regime.

One of the interoperability issues between multicarrier communication systems using different overlapping bandwidths for data transmission is the inaccurate estimate of sub-channel signal-to-noise ratios (SNRs) obtained during the training phase due to the aliased signal energy. This effect is illustrated in FIG. 5.

In FIG. 5, the original spectrum is labeled with reference numeral 20 and the image spectrum is labeled with reference numeral 22. In this example, the original spectrum has a bandwidth of B. Due to aliasing, however, the usable bandwidth has been reduced to a*B (where 0<a<1). The aliasing spectrum (denoted by shaded portion 24) uses the remainder to the otherwise available bandwidth.

This effect can significantly reduce the performance and in certain cases even prevent a data connection from being established. For example, in ADSL modems there are two distinct standards that specify downstream data transmission from the central office modem to the user modem over different bandwidths of 138 KHz-1.104 MHz (full-band) and 138 KHz-552 KHz (half-band).

Figure 1:
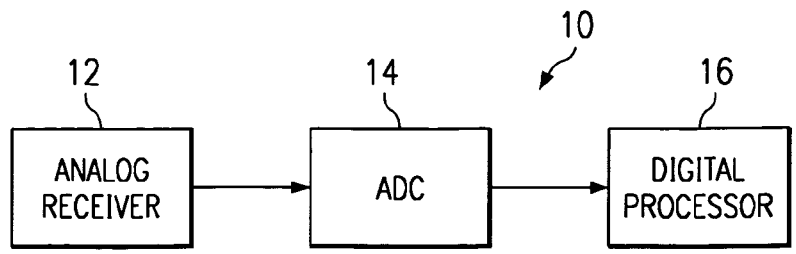
FIG. 1 is a simple block diagram of a known receiver.
Figure 2A:
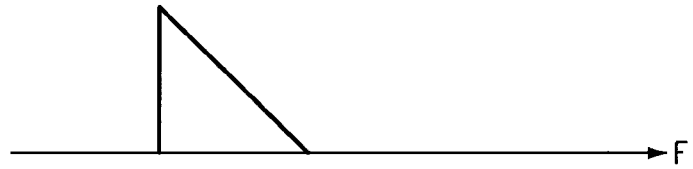
FIGS. 2a-2c illustrate the Nyquist theory.
Figure 2B:
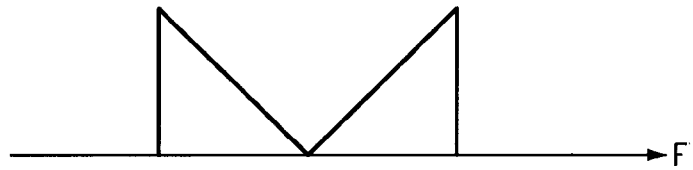
Figure 2C:
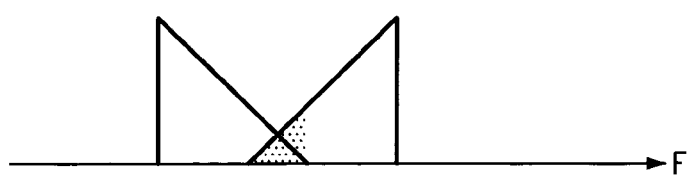

When a reduced-band user modem connects up to a full-band central office modem the out-of-band aliased energy transmitted from the central office modem during training sets the receive noise floor and hence significantly reduces the achievable performance as estimated during training (See FIG. 2). At the end of the training phase, however, the user modem indicates to the central office modem not to transmit data over the out-of-band frequency region, which includes the aliasing region 24. This indication was made based on the estimated SNRs, which are impacted by the aliasing effect. Hence, in reality the achievable data rate is much higher than that estimated during the training phase (since there is no aliased signal energy during data transfer).

The present invention includes embodiments that can be used to get around this problem. For example, in one embodiment the aliased signal components are eliminated in the user modem over the different subchannels (since the user modem is aware of the training signals transmitted by the central office modem) and then subtracting out the aliased signal energy during the SNR estimation phase. As mentioned above, the proposed alias cancellation method is general enough to be applied to any wireline or wireless multicarrier communications scenario (e.g., using DMT, OFDM, and others).

The following paragraphs provide a specific implementation of a preferred embodiment of the present invention to illustrate the usefulness of the invention.

This example provides methods for signal-to-noise ratio (SNR) estimation for reduced-rate remote terminal (RT) receivers operating against a full-rate central office (CO) transmitter. The techniques will be described with reference to a system that uses the discrete multi tone (DMT) modulation scheme. The terminology reduced versus full-rate refers to the number of frequency tones used in the DMT modulation, i.e., the reduced-rate modem uses a fraction $\alpha$ of the frequency tones that are available in the full-rate modem.

A typical scenario is that of a half-rate RT that only uses the first half of the frequency tones available to the full-rate CO that it communicates to. For example, this is the case for a G.lite RT (as shown, for example, in U.S. Pat. No. 6,044,107) communicating against a G.dmt CO (as shown, for example, in F. van der Putten (ed.), "G.dmt-bis: draft recommendation," ITU Telecommunications Standardization Sector Study Group 15 Question 4, August 2000) in the absence of a handshake procedure like the procedure shown by T. Cole (ed.), "G.lite-bis: draft recommendation," ITU Telecommunications Standardization Sector Study Group 15 Question 4, August 2000. Each of these three references is incorporated herein by reference.

During training, the full-rate CO transmits a full band signal that is also known by the RT. The half-rate receiver attempts to filter the upper half of the transmitted spectrum out. As described above, however, this is not a perfect operation. The part of the upper band of the received spectrum that makes it through the filter will show in the lower band as alias and will be considered as interference. Therefore, the SNR computation performed during training will be affected. It should be pointed out that during show time operation (after training) this will not be a problem, since the upper tones will have an SNR lower than the minimum and will not be used. One aspect of this invention provides a solution to this problem and proposes approaches to accurately estimate the SNR in the presence of the inevitable alias.

In the discussion that follows, it is assumed that the reduced-rate and full-rate modems have $\alpha N$ and $N$ frequency tones, respectively, with $\alpha<1$. This is illustrated in FIGS. 6a and 6b. Two frequency indexes are used. The first one represents the reduced-rate channel and is denoted by $k_1 \in [0, \alpha N-1]$. The second index, denoted by $k_2 \in [\alpha N, N-1]$, encompass those channels in the upper portion of the full-rate channel, i.e., the alias channel. These indexes are related by $k_2 = N-1-k_1$. Thus, the reduced-rate and alias channels are represented in the frequency domain as $H(k_1)$ and $H(k_2)$, respectively. The frame index is denoted by n and the received and training symbols, in the frequency domain, are denoted by $Y(k, n)$ and $X(k, n)$, respectively. With these definitions, the received signal is given by $$Y(k_1, n) = H(k_1)X(k_1, n) + H(X_2)X(k_2, n) + V(k_1, n), \quad (1)$$

where V represents the noise component.

In one aspect, the goal is to estimate the reduced-rate and alias channels based on the received signal $Y(k_1, n)$ and knowledge of the full-band transmitted signal, i.e., $X(k_1, n)$ and $X(k_2, n)$. In what follows, two methods are presented for estimating the reduced-rate and alias channels.

For truly uncorrelated training data (both with respect to the frame and tone indexes), the reduced-rate channel can be estimated as $$\begin{aligned} E[Y(k_1,n)X*(k_1,n)] &= E[H(k_1)X(k_1,n)X*(k_1,n) + H(k_2) \\ &\quad X(k_2,n)X*(k_1,n) + V(n)X*(k_1,n)] \\ &= E[H(k_1)X(k_1,n)X*(k_1,n) + \quad (2) \\ &\quad H(k_2)X(k_2,n)X*(k_1,n)] \\ &= E[H(k_1)X(k_1,n)X*(k_1,n)] \quad (3) \\ &= 2H(k_1), \quad (4) \end{aligned}$$

where equations (2) and (3) are a result of $X(k_1, n)$, $X(k_2, n)$, and $V(n)$ being uncorrelated, and equation (4) assumes that $X(k, n)$ is 4-QAM (quadrature amplitude modulation). Approximating the expectation operator with a time-average, $H(k_1)$ can be estimated as $$\hat{H}(k_1) = \frac{1}{2T}\sum_{n=0}^{T-1} Y(k_1, n)X*(k_1, n), \quad (5)$$

Using a similar derivation, $H(k_2)$ can be estimated as $$\hat{H}(k_2) = \frac{1}{2T}\sum_{n=0}^{T-1} Y(k_1, n)X*(k_2, n), \quad (6)$$

with underlying estimator given by $$\hat{H}(k_2) = \frac{1}{2}E[Y(k_1, n)X*(k_2, n)]. \quad (7)$$

More precisely (7) can be written as $$\begin{aligned} \hat{H}(k_2) &= \frac{1}{2}\{H(k_2)E[X(k_2,n)X*(k_2,n)] + H(k_1)E[X(k_1,n)X*(k_2,n)]\} \quad (8) \\ &= \frac{1}{2}\{H(k_2)\sigma_x^2(k_2) + H(k_1)r_x(k_1, k_2)\}, \end{aligned}$$

where $\sigma_x^2(k_2)$ is the energy of the training sequence at tone $k_2$ and $r_x(k_1, k_2)$ is the cross correlation between the sequences transmitted at tones $k_1$ and $k_2$. In the ideal scenario of equation (7), $\sigma_x^2(k2)=2$ (for 4-QAM) and, because of the independence assumption, $r_x(k_1, k_2)=0$, therefore, perfect alias channel estimation is possible. Unfortunately, this assumption does not always holds as pseudo random sequences with poor statistical properties are typically used in real modems.

A better estimate of the alias channel can be made by first estimating the reduced-rate channel, subtract its effect from the received symbols, and then estimate the alias channel. The procedure can be stated mathematically as follows.

Using a derivation similar to the one used for the alias $$\begin{aligned} \hat{H}(k_1) &= \frac{1}{2}E[Y(k_1, n)X*(k_1, n)] \quad (9) \\ &= \frac{1}{2}\{H(k_1)\sigma_x^2(k_1) + H(k_2)r_X(k_1, k_2)\}, \end{aligned}$$

It is noted that the estimate of $H(k_1)$ is better than the estimate of $H(k_2)$ because it is assumed that $H(k_1) \geq H(k_2)$. This statement can be qualified by identifying the error component of the channel estimates, i.e., the second term in equations (9) and (8).

$$|e_{k_1}|^2 = |H(k_2)|^2 |r_x(k_1,k_2)|^2, \quad (10)$$

$$|e_{k_2}|^2 = |H(k_1)|^2 |r_x(k_1,k_2)|^2, \quad (11)$$

$$\frac{|e_{k_2}|^2}{|e_{k_1}|^2} = \frac{|H(k_1)|^2}{|H(k_2)|^2} \ll 1 \quad (12)$$

The effect of the reduced-rate channel can be subtracted as follows.

$$\overline{Y}(k_1, n) = Y(k_1, n) - \hat{H}(k_1)X(k_1). \quad (13)$$

And based on these calculations, the alias channel can be estimated.

$$\begin{aligned} \hat{H}(k_2) &= \frac{1}{2}E[\overline{Y}(k_1, n)X*(k_2, n)] \quad (14) \\ &= \frac{1}{2}\{H(k_2)\sigma_x^2(k_2) + ((H(k_1) - \hat{H}(k_1))r_x(k_1, k_2)\} \end{aligned}$$

The improvement of this approach over that of equation (8) is quantified by comparing the corresponding error energies, i.e., $$|e'_{k_2}|^2 = |H(k_1) - \hat{H}(k_1)|^2 |r_x(k_1, k_2)|^2, \quad (15)$$

More specifically, the ratio of equations (11) and (15) gives $$\frac{|e_{k_2}|^2}{|e'_{k_2}|^2} = \frac{|H(k_1)|}{|H(k_1) - \hat{H}(k_1)|} > 1. \quad (16)$$

Once the reduced-rate and alias channels have been identified using either of the methods proposed above, the noise can be estimated as $$V(n) = Y(k_1, n) - H(k_1)X(k_1, n) - H(k_2)X(k_2, n). \quad (17)$$

Using data from time n=0, ..., T−1, the noise variance can be estimated as $$\sigma_v^2 = \frac{1}{T} \sum_{n=0}^{T-1} V(n)V*(n). \quad (18)$$

The sub-channel SNR can then be estimated by $$SNR(k_1) = \frac{\sigma_x^2 |H \cdot (k_1)|^2}{\sigma_v^2}, \quad (19)$$

where $\sigma_x^2=2$ for 4-QAM.

An alternate embodiment can utilize a low complexity alias cancellation approach that is conceptually equivalent to the two stage method for estimating the reduced-rate and aliased channels described previously. This reduced implementation approach uses only one fourth of the available data, effectively reducing the memory and computational requirements by the same factor.

The low complexity approach implicitly calculates the reduced-rate channel $H(k_1)$, subtract its effect from the receive signal, and then estimates the alias channel $H(k_2)$. First, the effect of the receive channel on the constellation ++ is obtained by averaging received tones carrying the desired constellation, i.e., $X(k_1, n)=1+j$. This is, $$\hat{Y}_{++}^1(k_1)=E[Y(k_1,n)]≈H(k_1)(1+j) \text{ with}$$
$$k_1, n \text{ s.t. } X(k_1,n)=(1+j). \quad (20)$$

Second, four averages of the received symbols are estimated, this is, $$Y_{++}^{1,2}(k_1) = E[Y(k_1, n)] \text{ with} \quad (21)$$
$$k_1, n \text{ s.t. } X(k_1, n) = (1+j) \text{ and } X(k_2, n) = (1+j)$$
$$≈ Y_{++}^1(k_1) + H(k_2)(1+j),$$

$$Y_{-+}^{1,2}(k_1) = E[Y(k_1, n)] \text{ with} \quad (22)$$
$$k_1, n \text{ s.t. } X(k_1, n) = (1+j) \text{ and } X(k_2, n) = (-1+j)$$
$$≈ Y_{++}^1(k_1) + H(k_2)(-1+j),$$

$$Y_{+-}^{1,2}(k_1) = E[Y(k_1, n)] \text{ with} \quad (23)$$
$$k_1, n \text{ s.t. } X(k_1, n) = (1+j) \text{ and } X(k_2, n) = (1-j)$$
$$≈ Y_{++}^1(k_1) + H(k_2)(1-j),$$

$$Y_{--}^{1,2}(k_1) = E[Y(k_1, n)] \text{ with} \quad (24)$$
$$k_1, n \text{ s.t. } X(k_1, n) = (1+j) \text{ and } X(k_2, n) = (-1-j)$$
$$≈ Y_{++}^1(k_1) + H(k_2)(-1-j),$$

one for each of the four possible alias constellation $X(k_2, n)=\pm 1 \pm j$ and conditioned to the ++ received point, i.e., $X(k_1,n)=1+j$. Finally, the effect of $H(k_2)$ on the received symbol is calculated as $$Y_{++}^2(k_1)=Y_{++}^1(k_1)-Y_{++}^{1,2}(k_1)≈-H(k_2)(1+j) \quad (25)$$

$$Y_{-+}^2(k_1)=Y_{++}^1(k_1)-Y_{-+}^{1,2}(k_1)≈-H(k_2)(-1+j) \quad (25)$$

$$Y_{+-}^2(k_1)=Y_{++}^1(k_1)-Y_{+-}^{1,2}(k_1)≈-H(k_2)(1-j) \quad (27)$$

$$Y_{--}^2(k_1)=Y_{++}^1(k_1)-Y_{--}^{1,2}(k_1)≈-H(k_2)(-1-j) \quad (28)$$

These quantities are subtracted directly from the received frames prior to SNR calculation to cancel the alias component, $$\overline{Y}(k_1,n)=Y(k_1, n)+Y_{++}^2(k_1) \text{ for } k_1,n \text{ s.t. } X(k_2,n)=(1+j) \quad (29)$$

$$\overline{Y}(k_1,n)=Y(k_1,n)+Y_{-+}^2(k_1) \text{ for } k_1,n \text{ s.t. } X(k_2,n)=(-1+j) \quad (30)$$

$$\overline{Y}(k_1,n)=Y(k_1,n)+Y_{+-}^2(k_1) \text{ for } k_1,n \text{ s.t. } X(k_2,n)=(1-j) \quad (31)$$

$$\overline{Y}(k_1,n)=Y(k_1,n)+Y_{--}^2(k_1) \text{ for } k_1,n \text{ s.t. } X(k_2,n)=(-1-j) \quad (32)$$

One immediate improvement of this approach will be to combine the four "estimates" of the alias channel $H(k_2)$ into a single one. This will require rotating the $Y_{xx}^2$ and averaging at the end.

Independently of the method used for alias cancellation, care should be taken when calculating expectations if a training sequence with poor statistical properties is used. In particular, this is the case for the T1.413 Medley sequence. This limitation can be resolved by considering the same number of constellation points for implementing the expectation operators.

Figure 7:
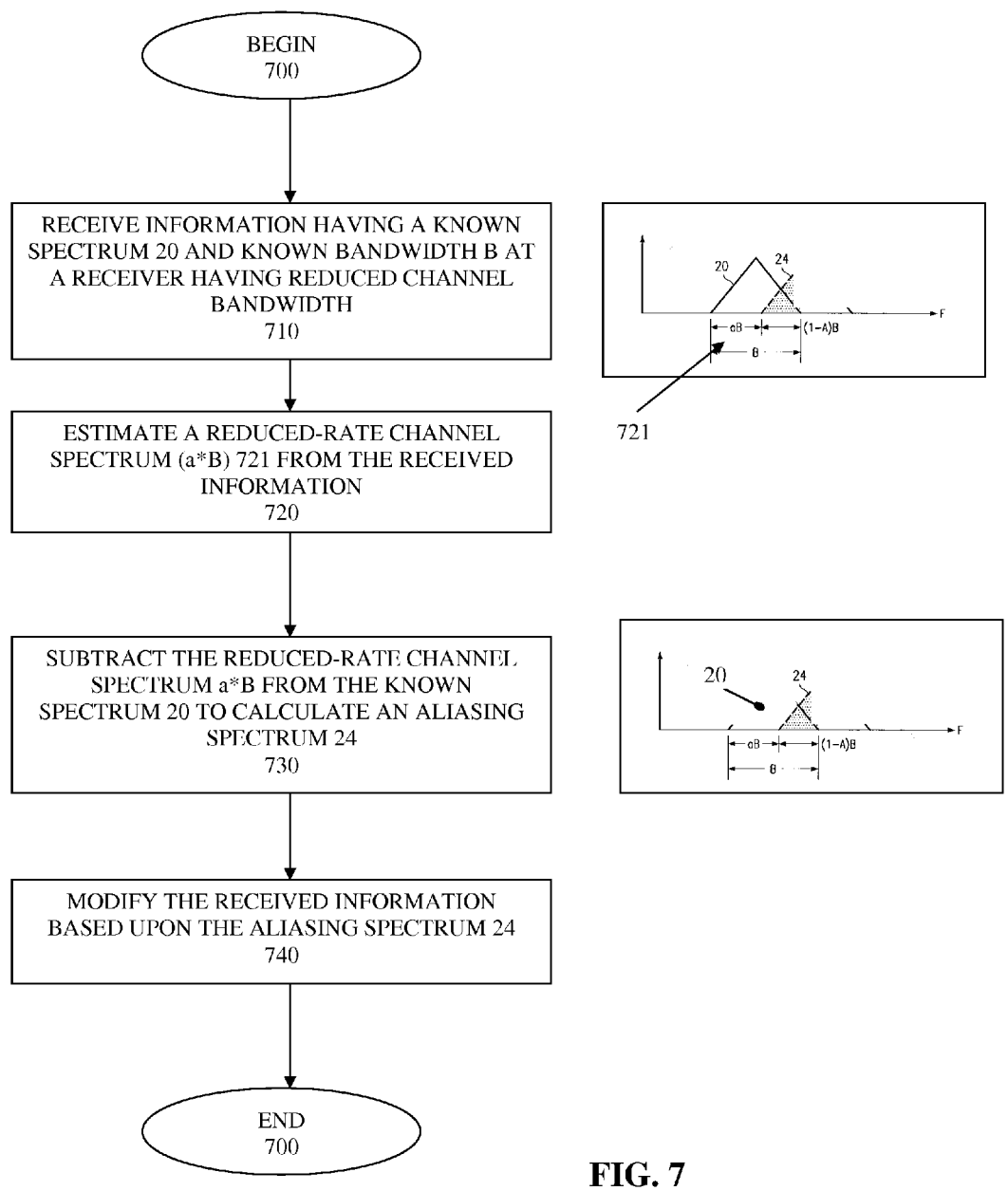
FIG. 7 illustrates a method of communicating across a channel in accordance with an embodiment.

A method of communicating across a channel is shown on FIG. 7. The method begins at 700. Information having a known bandwidth and a known spectrum is received at a receiver having a reduced channel bandwidth that is less than the known bandwidth at 710. At 720, an estimate of a reduced-rate channel spectrum 721 is calculated from the received information. At 730, the reduced-rate channel spectrum 20 is subtracted from the known spectrum 24. At 740, the received information is modified based upon the aliasing spectrum 24. The method ends 750.

So far, the present invention has been described in the context of an ADSL modem using DMT modulation scheme. It is noted, however, that the invention can be applied to a great number of other applications. Basically, any multi-tone communication systems could benefit from this invention.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of communicating across a channel, the method comprising:
    receiving information having a known bandwidth and a known spectrum, the information being received at a receiver having a reduced channel bandwidth that is less than the known bandwidth;
    calculating an aliasing spectrum based on the known spectrum and the frequency difference between the known bandwidth and the reduced-channel bandwidth; and
    modifying the received information based upon the aliasing function to compensate for alias distortion,
    wherein calculating an aliasing spectrum comprises:
        estimating a reduced-rate channel spectrum from the received information; and
        subtracting the reduced-rate channel spectrum from the known spectrum.

2. The method of claim 1 wherein calculating an aliasing spectrum comprises calculating the aliasing spectrum directly from the known spectrum.

3. The method of claim 1 wherein the received information comprises 4-QAM information.

4. The method of claim 1 wherein modifying the received information comprises estimating a compensated signal-to-noise ratio within the reduced-channel, the compensated signal-to-noise ratio being estimated to reduce the effect of the aliasing spectrum.

5. The method of claim 1 wherein the received information comprises a multicarrier modulated signal.

6. The method of claim 5 wherein the received information comprises a discrete multitone (DMT) modulated signal.

7. The method of claim 5 wherein calculating an aliasing spectrum comprises:
- selecting a constellation having a number of symbol;
- averaging received tones carrying the constellation;
- estimating an average received symbol for each symbol in the constellation; and
- modifying the received information based the average received symbols.

8. A method of initializing a communication channel, the method comprising:
- receiving a multicarrier modulated signal having subcarriers at each of a number of frequencies over a particular bandwidth, the multicarrier modulated signal including a plurality of known training symbols;
- estimating an alias signal-to-noise ratio attributable to an aliasing spectrum based upon the known training symbols;
- estimating a reduced-channel signal-to-noise ratio for each of the subcarriers, the reduced channel signal-to-noise ratio being estimated using the alias signal-to-noise ratio; and
- determining a usable portion of the communication channel based upon the reduced-channel signal-to-noise ratio.

9. The method of claim 8 and further comprising communicating the reduced-channel signal-to-noise ratio to a second communication device across the communication channel.

10. The method of claim 8 wherein the multicarrier modulated signal comprises a discrete multitone modulated signal.

11. The method of claim 8 wherein the communication channel comprises a digital subscriber line (DSL).

12. The method of claim 11 wherein the communication channel comprises an asymmetric digital subscriber line.

13. The method of claim 11 wherein the multicarrier modulated signal is received at the remote unit on a DSL system.

14. The method of claim 8 wherein estimating an alias signal-to-noise ratio comprises calculating a alias signal-to-noise ratio directly from the known training symbols.

15. The method of claim 14 wherein estimating an alias signal-to-noise ratio comprises:
- estimating a reduced-rate channel spectrum from the received signal;
- estimating an alias channel spectrum from the received signal; and
- estimating noise attributable to the alias channel based reduced-rate channel spectrum and the alias channel spectrum.

* * * * *